United States Patent
Leising et al.

[11] 3,897,961
[45] Aug. 5, 1975

[54] INFLATABLE RESTRAINT APPARATUS

[75] Inventors: Maurice B. Leising, Clawson; John J. Lenosky, East Detroit, both of Mich.

[73] Assignee: Chrysler Corporation, Highland Park, Mich.

[22] Filed: May 2, 1973

[21] Appl. No.: 356,643

[52] U.S. Cl......... 280/150 AB; 5/348 R; 280/150 B
[51] Int. Cl.² ..................................... B60R 21/08
[58] Field of Search................. 280/150 AB, 150 B; 5/348 R

[56] References Cited
UNITED STATES PATENTS

| | | | |
|---|---|---|---|
| 2,741,780 | 4/1956 | Kimbrig | 5/348 R |
| 2,806,737 | 9/1957 | Maxwell | 280/150 AB X |
| 2,834,606 | 5/1958 | Bertrand | 280/150 AB |
| 2,834,609 | 5/1958 | Bertrand | 280/150 AB |
| 2,931,665 | 4/1960 | Sandor | 280/150 AB |
| 3,197,234 | 7/1965 | Bertrand | 280/150 AB |
| 3,510,150 | 5/1970 | Wilfert | 280/150 AB |
| 3,588,142 | 6/1971 | Gorman | 280/150 AB |
| 3,687,485 | 8/1972 | Campbell | 280/150 AB |
| 3,690,695 | 9/1972 | Jones | 280/150 AB |
| 3,703,313 | 11/1972 | Schiesterl | 280/150 AB |
| 3,731,949 | 5/1973 | Radke | 280/150 AB |
| 3,753,576 | 8/1973 | Gorman | 280/150 AB |
| 3,762,741 | 10/1973 | Fleck | 280/150 AB |
| 3,774,936 | 11/1973 | Barnett | 280/150 AB |

FOREIGN PATENTS OR APPLICATIONS

| | | | |
|---|---|---|---|
| 1,392,677 | 2/1965 | France | 280/150 AB |

*Primary Examiner*—David Schonberg
*Assistant Examiner*—John P. Silverstrim
*Attorney, Agent, or Firm*—Talburtt & Baldwin

[57] ABSTRACT

Inflatable restraint apparatus for automotive vehicle occupants including an inflatable torso bag structure adapted to be deployed from the roof of the vehicle by one or more filler tubes extending from the roof to the inflated bag. Inflatable side curtains also deployed from the roof are provided. The side curtains and inflated torso restraining bag may be interconnected to facilitate positioning or filling of the inflated structures.

10 Claims, 11 Drawing Figures

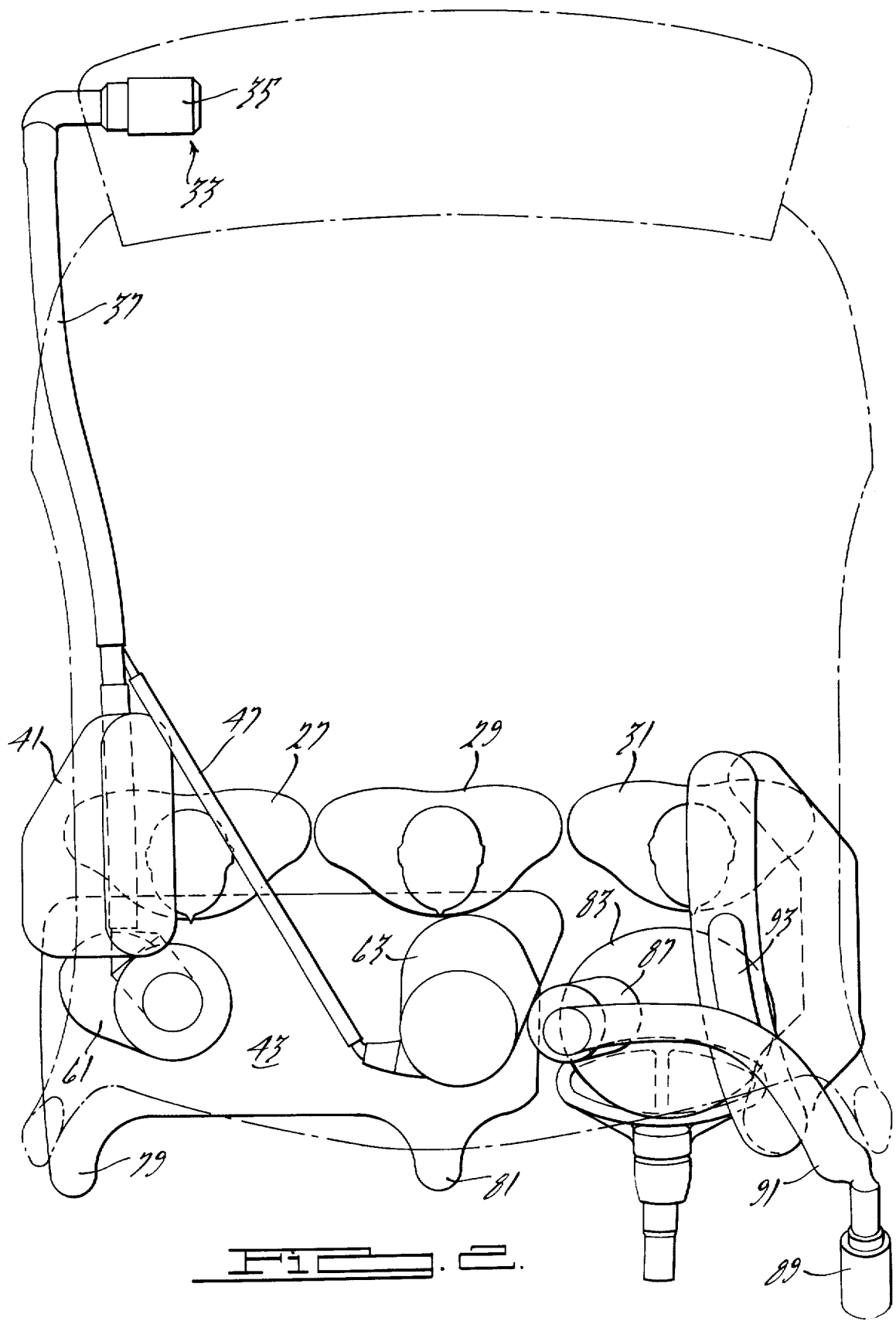

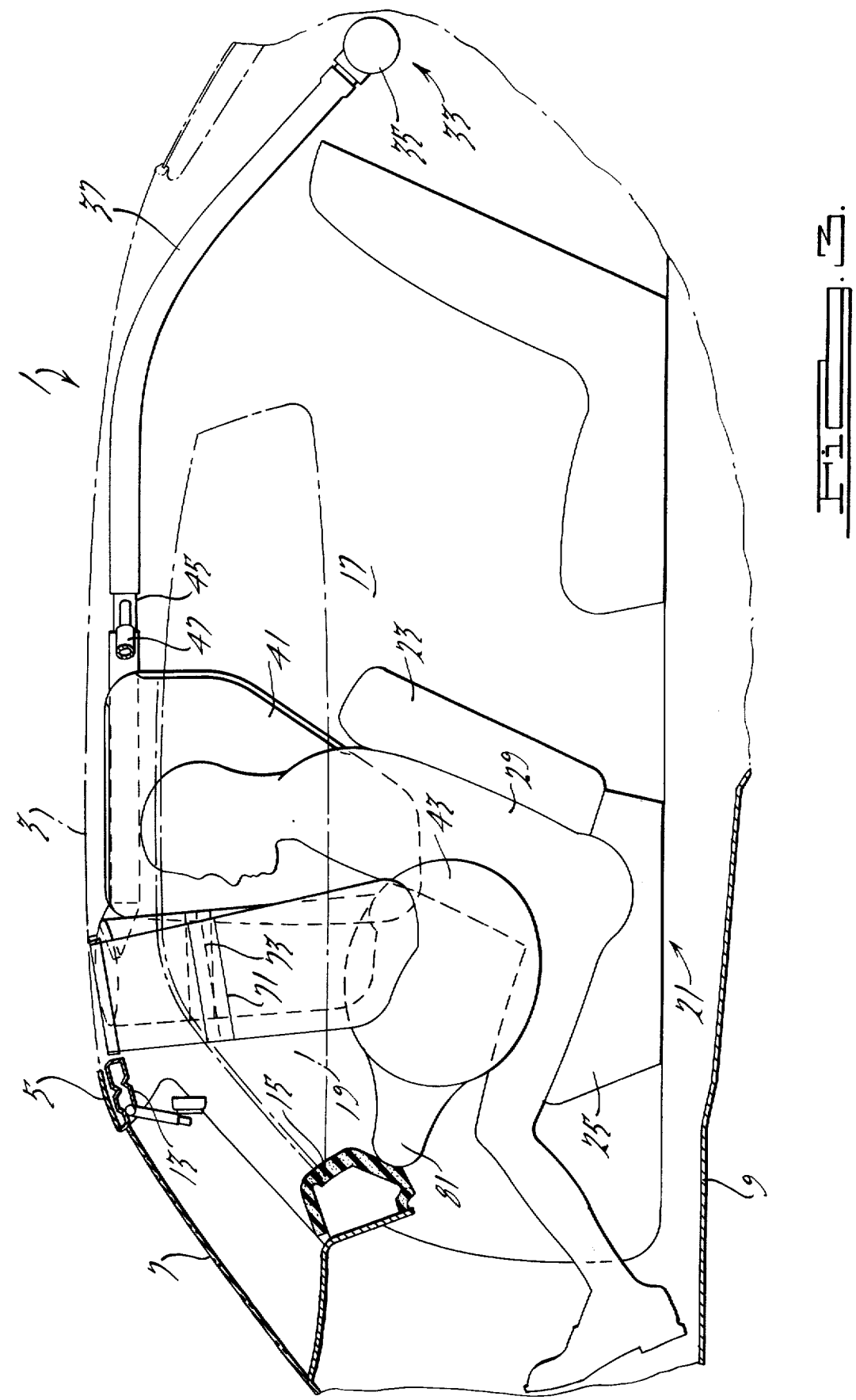

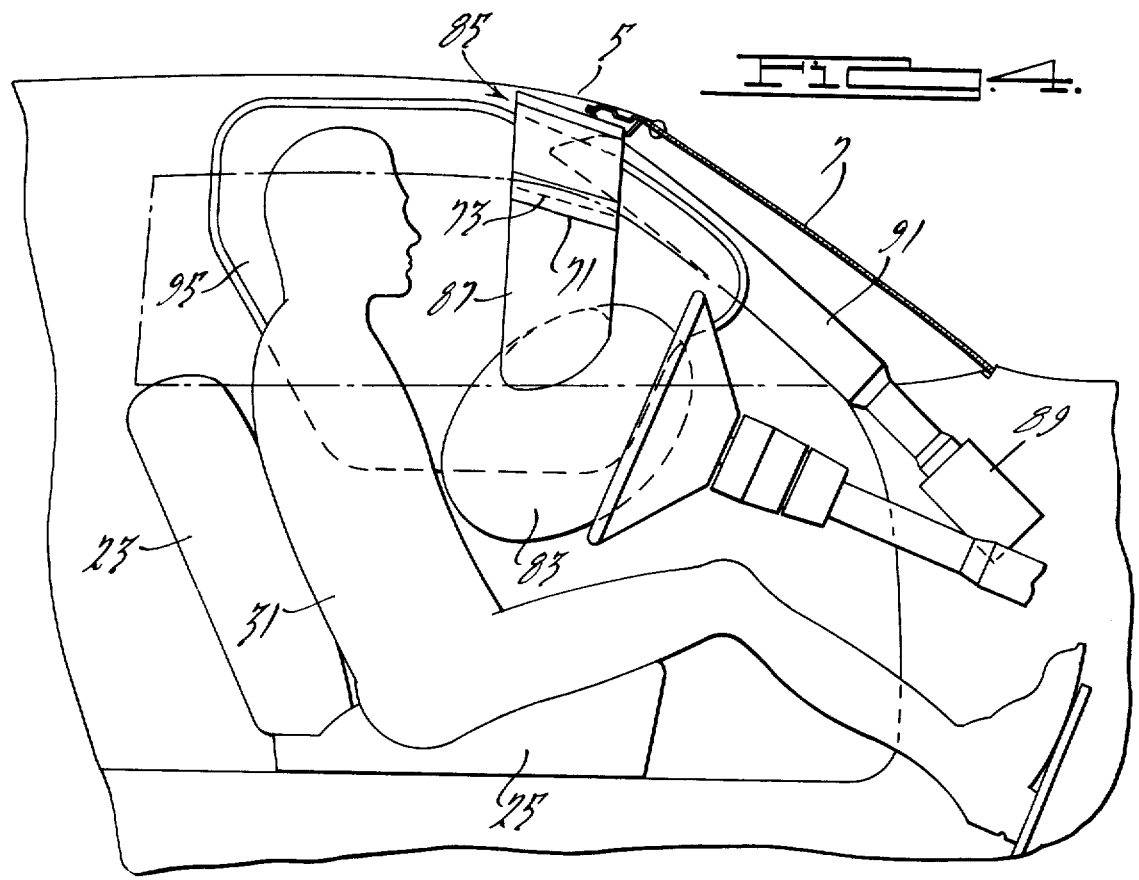
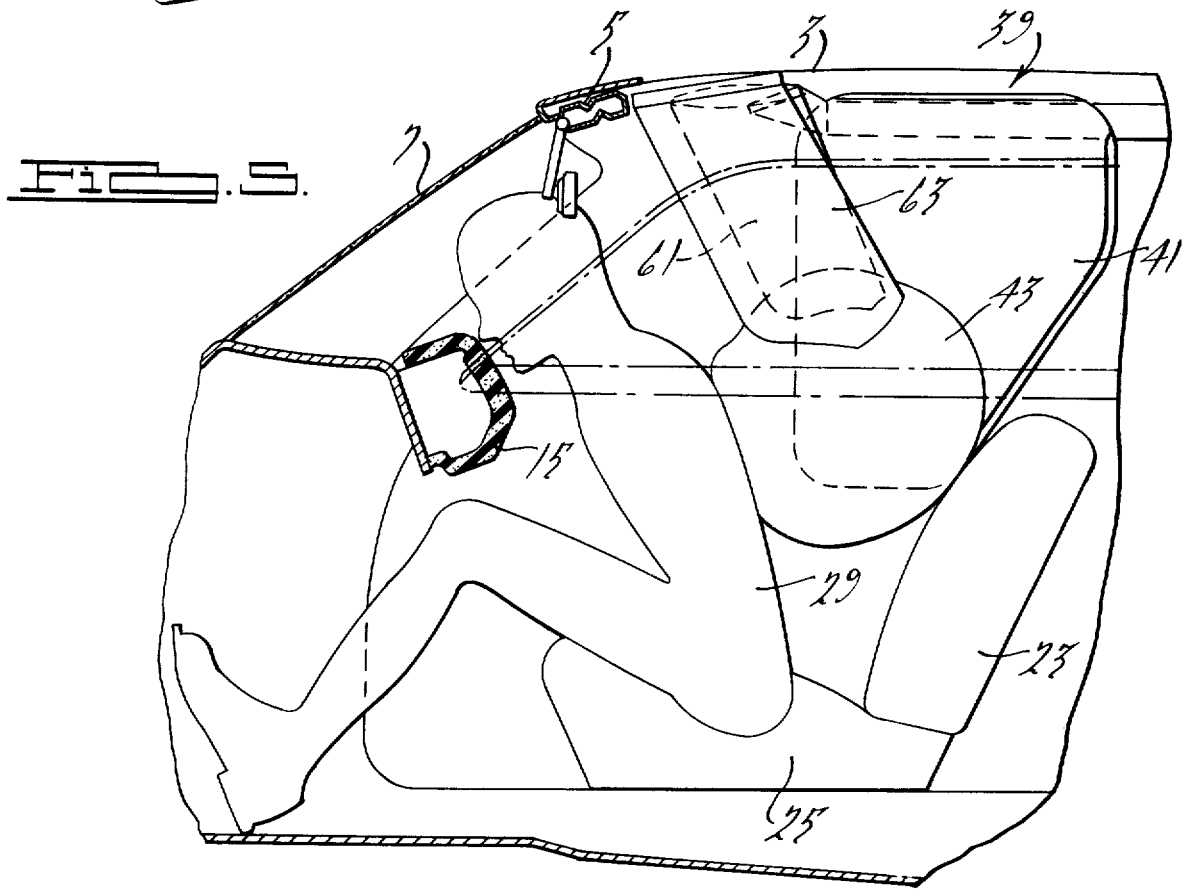

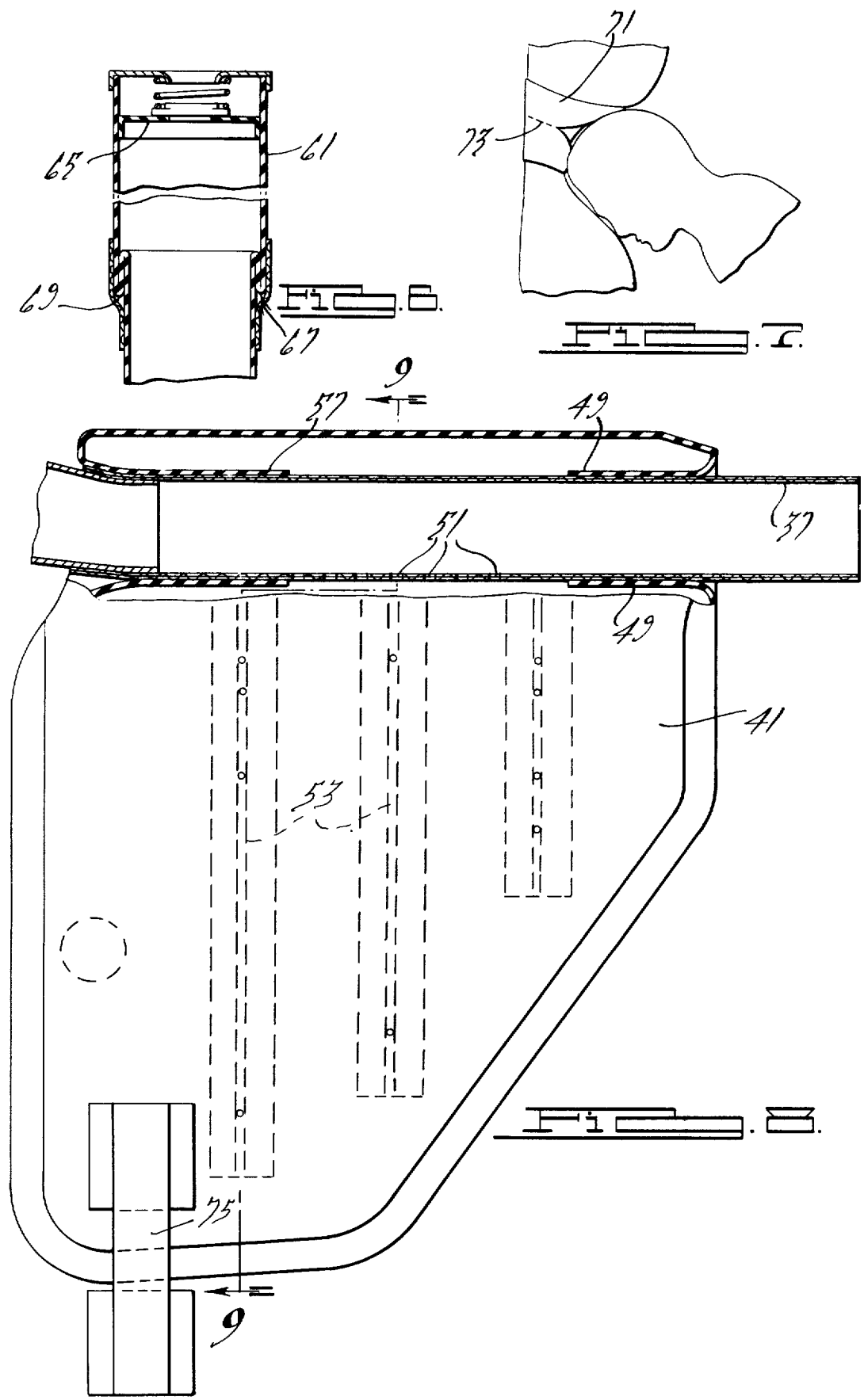

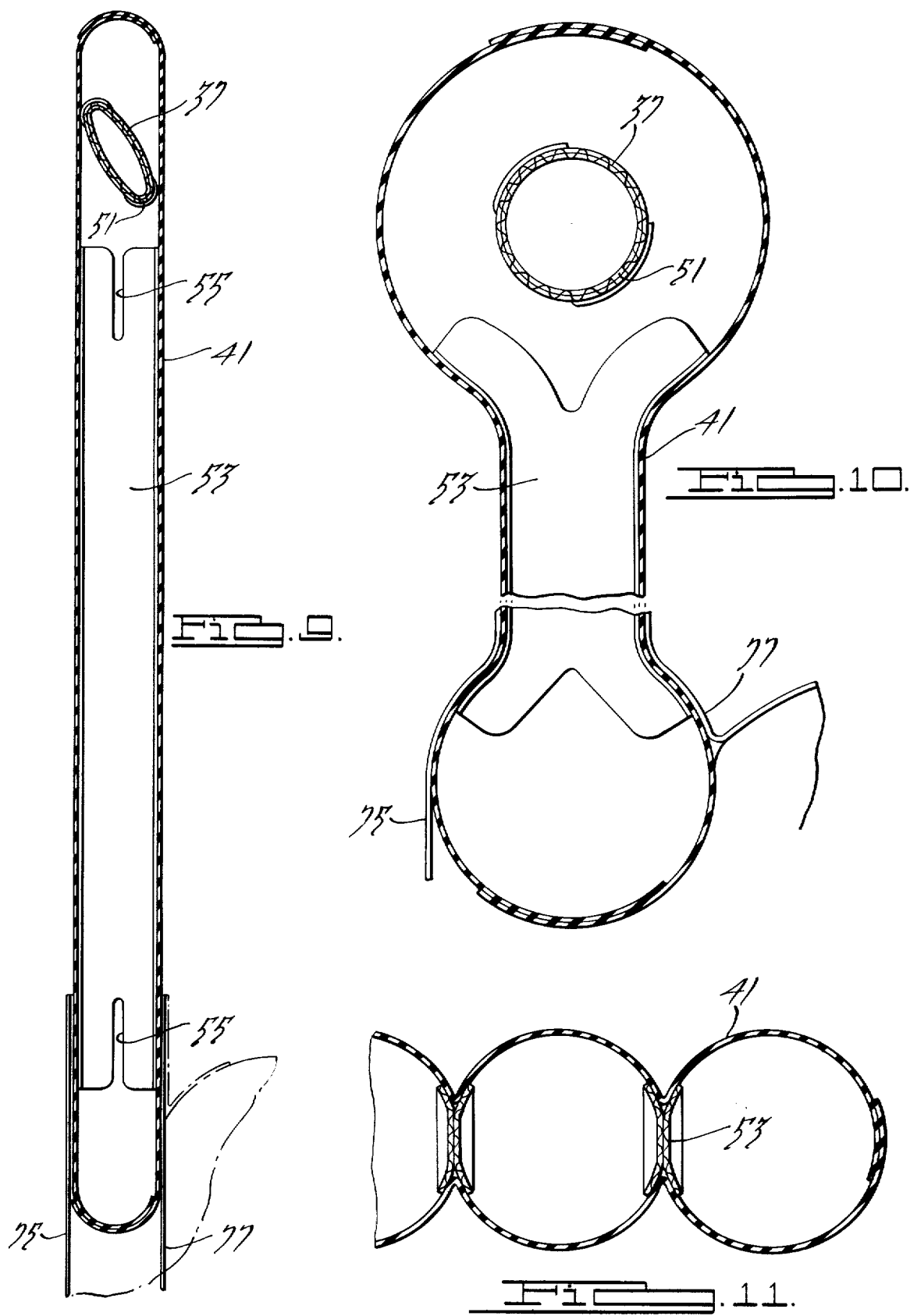

INFLATABLE RESTRAINT APPARATUS

BACKGROUND OF THE INVENTION

This invention relates to inflatable restraint apparatus, and more particularly to inflatable restraint devices for use in automotive vehicles for restraining movement of an occupant or occupants in the vehicle during an accident.

Inflatable restraint devices for restraining the movement of a vehicle occupant in the event of an accident are well known. These devices are adapted to be deployed and inflated when the vehicle is involved in an accident, the deployed and inflated devices providing a cushioning and restraint for the occupants of the vehicle. Most of these deployable inflatable restraints are stored in the area of the instrument panel in front of the occupant. Some are deployed from below the instrument panel to engage the occupant's knees and others are deployed from the headliner area of the vehicle down in front of the torso of the occupant for restraining the same against forward movement. One of the big concerns regarding the foregoing types of restraint systems is their ability to restrain the occupants satisfactorily under various impact conditions, such as frontal collisions, lateral collisions and roll-over conditions. The present invention relates to inflatable devices of the type which are deployed from the roof of the vehicle and are directed to restraining the occupants under various accident situations.

BRIEF SUMMARY OF THE INVENTION

Briefly, this invention comprises inflatable restraint apparatus having a torso restraining bag section connected to the roof and to a source of gas by one or more tubes or other inflatable elements, and also having a side curtain portion inhibiting an occupant's egress from the vehicle through a door or side window.

One of the primary objects of this invention is to provide an inflatable restraint device which provides occupant restraint under frontal and lateral collisions, as well as under roll-over conditions, thus providing protection under all impact modes.

Another object of this invention is to provide a restraint system which keeps an occupant's head from going through a side window or side window opening, and from engaging a side roof rail of the vehicle.

A further object of this invention is to provide a restraint system of the type described which tends to hold the occupants down against the seat portion of the seat as well as against the back portion of the seat.

Still another object of this invention is to provide a restraint apparatus such as described which provides protection against occupant head to A-pillar impacts.

A further object of this invention is to provide a restraint device of the class described which is adapted to provide cushioning and containment of the occupants during side impacts.

A further object of this invention is to provide a restraint device of the type described adapted to relieve the pressure inside the restraint when it tends to rise above a predetermined value, thereby reducing rebound velocity.

Another object of this invention is to provide a restraint device of the class described which is aesthetically pleasing and is adapted to be deployed from the roof of the vehicle.

Another object of this invention is to provide an inflatable restraint device of the type described which does not necessarily restrict the vision of the occupant even though the device is deployed from the roof of the vehicle.

A further object of this invention is to provide an inflatable restraint device of the type described which is adapted to collapse a certain amount if the occupant's head engages therewith during an accident, while at the same time providing restraint for the head as well as for the torso.

Another object of this invention is to provide an inflatable restraint device of the class described which is adapted to position itself between the instrument panel and a passenger sitting in a conventional upright position and provide cushioning for forward impacts.

A further object of this invention is to provide an inflatable restraint device such as described which is operable to restrain an out-of-position occupant, i.e., if the occupant is in a forward position, for example, the restraint is adapted to be deployed in such a manner that the passenger is held against the instrument panel during the accident.

A further object of this invention is to provide an inflatable restraint device of the type described wherein the side curtain and torso portions of the inflatable restraint device may be coupled together to facilitate deployment.

A further object of this invention is to provide locater means which place the torso bag in the appropriate position and also provide an accommodation for locating the bag even though the seat of the vehicle may be in various forwardly and rearwardly positions.

Another object of this invention is to provide an inflatable restraint device of the class described which is simple and economical in construction, yet effective in operation.

Other objects and advantages of this invention will be made apparent as the description progresses.

DESCRIPTION OF THE DRAWINGS

In the accompanying drawings, in which several of various possible embodiments of this invention are illustrated.

FIG. 2 is a plan view of FIG. 1 showing the vehicle in broken lines;

FIG. 3 is a section taken along line 3—3 of FIG. 1;

FIG. 4 is a fragmentary section taken along line 4—4 of FIG. 1;

FIG. 5 is a fragmentary section, generally similar to FIG. 3 showing the deployment of the restraint apparatus for an out-of-position occupant;

FIG. 6 is an enlarged section taken along line 6—6 of FIG. 1;

FIG. 7 is a side elevation of the tube shown in FIG. 6 with an occupant's head engaged therewith to illustrate a feature of the restraint apparatus;

FIG. 8 is an enlarged side elevation of a side curtain forming part of this restraint apparatus;

FIG. 9 is a section taken along lines 9—9 of FIG. 8;

FIG. 10 is an enlarged fragmentary section, similar to FIG. 9, illustrating a side curtain in an inflated condition; and FIG. 11 is a fragmentary section taken through the mid portion of the curtain shown in FIG. 10.

Like parts are shown by corresponding reference characters throughout the several views of the drawings.

DESCRIPTION OF THE PREFERRED EMBODIMENTS

Figure 1:
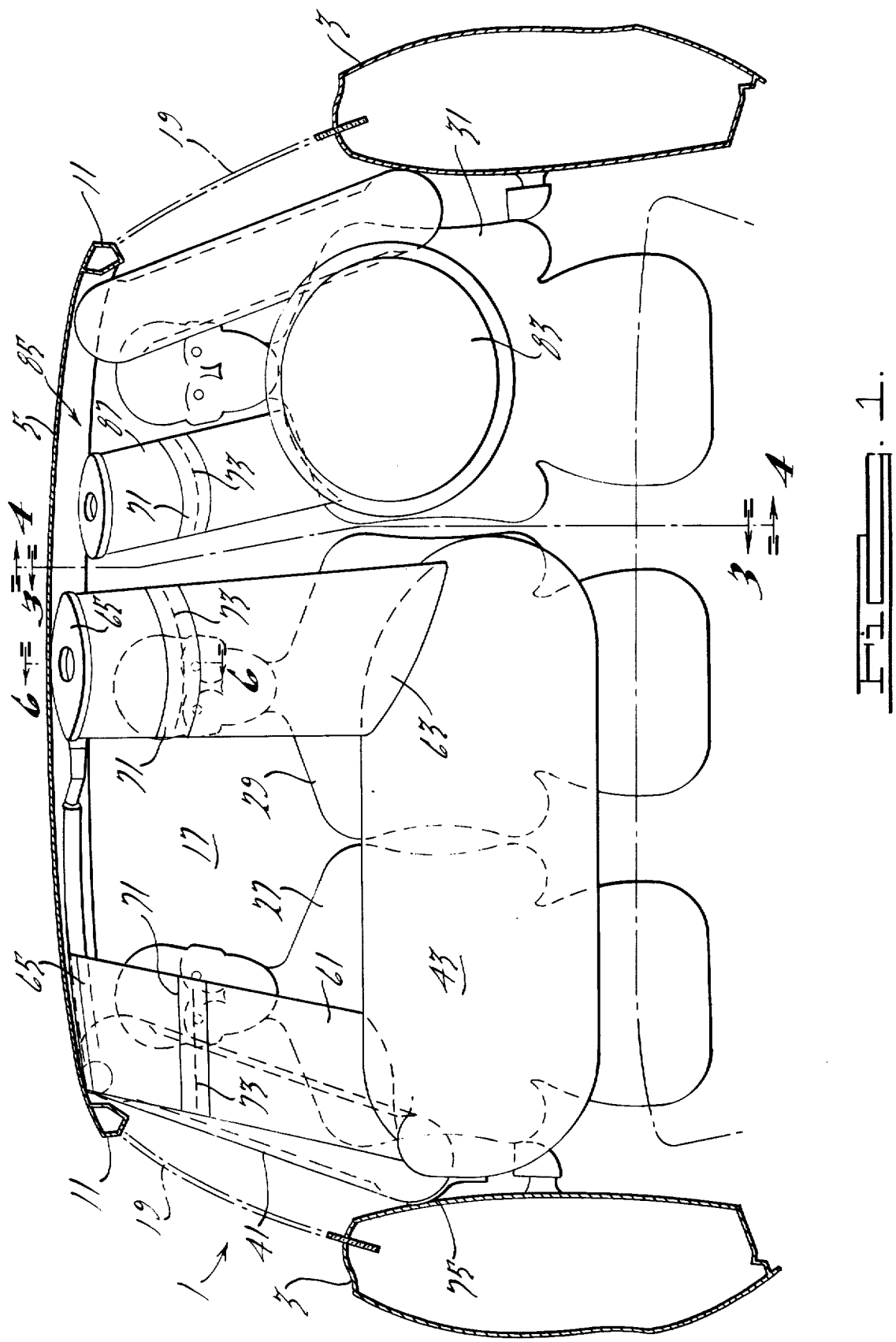
FIG. 1 is a front elevation, partly in section, of a restraint system constructed in accordance with this invention, shown in a deployed condition.

Referring now to the drawings, and in particular FIGS. 1, 2 and 3, the numeral 1 generally denotes a vehicle having a body 3 which includes a roof 5, a front window 7 and a floor 9. Longitudinally extending rails 11 are provided at the edges of the roof 5, with a front rail 13 extending between the front ends of the side rails above window 7. An instrument panel 15 is also provided at the forward end of a passenger compartment 17 formed by the roof, front window, floor and side windows 19.

As shown, the passenger compartment 17 includes an occupant seat 21 having an upright back portion 23 and seating portion 25. Occupants 27, 29 and 31 are shown seated in seat 21.

The apparatus of this invention includes at least one gas source 33 for supplying gas to the inflatable restraints. The gas source may be of various types, such as the gas generating types, or the gas storage or reservoir type. As shown, a reservoir type 35 is shown located rearwardly of the passenger compartment. The reservoir 35 is connected by a collapsible flexible tube or conduit 37 extending along the roof to a housing area 39 located in the roof over the front seat area.

Tube 37 is connected to an inflatable side curtain 41 and to an inflatable torso restraining bag 43. A Y-shaped section 45 and tube 47 connect tube 37 to another portion of torso bag 43. More specifically, tube 37 extends into an inturned sleeve 49 of the side curtain 41. The tube 37 includes a plurality of openings 51 through which the gas may pass. The side curtain 41 is normally maintained in a folded condition in the housing area 39, but when filled with gas is adapted to extend across the side window 19 and inhibit movement of the passenger therethrough or against the roof rail.

The side curtain 41 is maintained in a generally flat condition upon inflation by means of a plurality of restraining webs 53 spaced apart from one another in a longitudinal direction of the vehicle. The side curtain, in between the webs 53, tends to assume a cylindrical configuration, but the over-all generally flat configuration is maintained. Each web has an elongated notch or recess 55 at the upper and lower ends thereof for permitting such upper and lower ends to expand outwardly into a larger volumetric space as shown in FIG. 10. This enlarged upper section provides additional cushioning between the occupant's head and the roof rail. Moreover, the strain on the connection between the ends of the webs and the curtain walls, whether adhesive or sewing or any other type, is lessened because of the use of the notches.

The forward end of the tube 37 extends into an inturned sleeve 57 which, as shown, is joined by a connector 59 to one of two filler tubes 61 and 63 for torso bag 43. Filler tube 61 is a flexible fabric or the like tube which is normally folded, along with bag 43, and stored in storage area 39. More specifically, the tube 61 includes a spring biased blow-off or relief valve shown diagrammatically at 65 for permitting gas to escape if the pressure in the tube exceeds a predetermined amount.

Tube 61 also has a ring portion 67 folded or rolled back upon itself as shown at 69 in FIG. 6 which, as made apparent hereinafter, provides an expansible section to permit head penetration. A cover tear-away strip 71 having perforation 73 therearound is adapted to rip to permit unfolding of folded ring portion 67. Tube 61 is adapted, when inflated, to extend from the roof down to the torso bag, and will function as a strut or brace for holding the torso bag against the occupants' laps. Tube 63 is of the same construction as tube 61 and is connected to the Y-shaped section 45 by tube 47.

The side curtain 41 is connected to the torso bag 43 by two straps 75 and 77 in a manner which effects proper deployment and positioning of the curtain relative to the torso bag. It will be understood that the connection between the side curtain and the torso bag, both at the passage means for the gas and at the point at which the straps 75 and 77 are located could be different than shown. For example, the side curtain and torso bag could be formed integrally with one or more openings at the forward end of the curtain providing the gas passages and the bags could be integrally sewn or formed together adjacent the bottom of the curtain.

The torso bag 43 may be provided with two inflatable positioning stubs or locaters 79 and 81 extending forwardly from the torso bag 43. These stubs cause the torso bag 43 to push the bag toward and into engagement with the torso of the occupant.

Driver protection is provided by a driver bag 83 adapted to be stored in a housing area 85 in roof 5. A filler tube 87 generally similar to tubes 61 and 63 connects the driver bag to the supply of gas. As shown, a gas generator or storage bottle 89 is provided in the forward portion of the vehicle with a tube 91 extending up the A-pillar to the tube 87. A relief or blow-off valve 65 is also provided in the tube 87 to permit the escape of gas if the pressure in the tube and bag exceeds a predetermined amount. A branch tube 93 extends from tube 91 to a side curtain 95 generally similar in construction to said curtain 41. However, curtain 95 is shaped differently than curtain 41 as shown. While a separate gas source is shown for the driver bag 83 and side curtain 95, it will be understood that both bags 43 and 83 and both of the side curtains could be connected to the same gas source.

Assuming that occupants are in the position shown in FIGS. 1 and 2, operation and deployment of the apparatus is as follows:

The gas for inflating the torso bag 43 and side curtain 41 is generated or supplied to the area of the housing or reservoir 35 and immediately is forced into the filler tube 61 and then through openings 51 into side curtain 41. Gas is also supplied to tube 63 through tube 47. As the gas fills the filler tubes the bag 43 is thrown into the laps of the center and right side occupants to form a generally U-shaped restraint. Also, the curtain 41 is pulled down by means of the connection straps 75 and 77. As the gas continues to flow through the filler tubes 61 and 63 into the bag section 43 the latter is filled and generally assumes the shape shown in FIGS. 1-3, with the stubs 79 and 81 engaging the instrument panel and forcing the bag against the torso of the occupants. The inflated tubes or struts and torso bag tend to keep the occupants engaged thereby in their seated position with their legs held against the seat portion. At the same time, the side curtain 33 is inflated into and pulled into its side position on the outside of the occupants and is inflated to provide a cushion. If either of the passengers moves forward and his head engages the filler tube 61 or 63, the perforations 73 in the cover 71 give away and permit the tube to unfold and expand in that area, thereby permitting the occupant's head to move forwardly to the position shown in FIG. 7. Accordingly, a resilient restraint is provided for the head. The stubs 79 and 81 will probably collapse as the occupants move forward into engagement with the bag section 43. However, as noted previously, the purpose of the stubs is primarily to position the bag against the occupant's torso during the initial deployment.

It will be seen that the bag section 43, by coming down in front of the occupants, effectively prevents substantial forward movement of the occupants. If the accident had occured when an occupant were in a forward position, such as generally shown in FIG. 5, the torso bag, on being deployed, would engage the back of the occupant and form a brace between the back 23 of seat 21 and the back of the occupant. Thus, the occupant would be held in the forward position generally against the instrument panel. This position may be as desirable during an impact as having the bag section 43 located between the torso and the instrument panel. In either event the passenger or occupant is restrained from substantial forward movement after the bag is deployed.

The driver bag 83 and side curtain 95 are also deployed simultaneously with the bag 43 by means of the tube 91 and gas source 89. The driver bag is adapted to be deployed into the space between the steering wheel and the driver's torso as shown in FIGS. 1, 2 and 4. The side curtain 95 extends downwardly between the driver and the door.

In view of the foregoing it will be seen that the inflatable restraint apparatus of this invention is adapted to be conveniently and aesthetically stowed in the vehicular roof structure, thus avoiding the necessity of tearing up the instrument panel to provide storage space for the bag apparatus. Moreover, the torso bag 43 is thrust downwardly toward the laps of the occupants, if the latter are in an upright position, and then are filled to provide the restraint for the occupants. The pusher stubs 79 and 81 engage the instrument panel and force the inflated section toward the occupants. The stubs also provide an accommodation for various seat positions, i.e., if the seat is in a forward position the stubs obviously do not become fully inflated and extended. However, if the seat is in a rearwardly position the stubs will fully inflate and move the bag back into engagement with the occupants. If the occupants are in an out-of-upright position the bag 43 still functions effectively to hold the occupants in a position against the instrument panel.

It will also be understood that the bags and side curtain provide protection in frontal, lateral and roll-over conditions. Protection is provided to the occupant's heads against engagement thereof with the A-pillar and with the side roof rails.

In view of the foregoing it will be seen that the other objects and advantages of this invention are achieved.

Although only one embodiment of the invention has been disclosed and described, it is apparent that other embodiments and modifications of the invention are possible.

We claim:

1. Restraint apparatus for an occupant of a vehicle having a roof, an instrument panel and an occupant compartment under said roof and rearwardly of said instrument panel, comprising a source of gas, inflatable bag means, storage means adjacent said roof for holding said inflatable bag means in a collapsed condition, said inflatable bag means comprising a laterally extending bag portion and a plurality of tube means spaced apart from each other and connecting said portion to said source of gas, said tube means and portion of said bag means being inflated by the passage of gas through said tube means into said portion of said bag means, said portion of said bag means when inflated, being spaced from said roof and held away therefrom by said tube means, said tube means and said one portion of said bag means providing an open space located above said one portion of said bag means, between said spaced tube means and below said roof and at least one inflatable stub-shaped projection extending forwardly from said portion for engaging said instrument panel whereby said bag means provides a downward and rearward force on said occupant 2. Restraint apparatus as set forth in claim 1 wherein said tube means comprises two tubes spaced apart from one another to form a generally U-shaped inflatable bag means, said tubes being connected together at one end by said roof and at the other end by said one portion of said bag means, said tubes being otherwise free of one another, said tubes, said one portion of said bag means and said roof forming the perimeter of said open space.

3. Restraint apparatus for an occupant of a vehicle having a roof, an instrument panel, and an occupant compartment having a seat under said roof and rearwardly of said panel, comprising a source of gas, an inflatable torso bag, storage means adjacent said roof for holding said torso bag in a collapsed condition, at least one flexible inflatable filler means connecting said source of gas to said bag and stored in a collapsed condition in said storage means, said filler means, when gas is supplied thereto from said source, becoming extended and moving said bag downwardly from said roof towards said seat, said bag being inflated by gas passing through said filler means and when inflated, being spaced from said roof and held away therefrom by said filler means, said filler means providing restraint against movement of the head of an occupant, seated in said seat, forwardly against said instrument panel, said filler means having a folded portion extensible in response to an impact thereon by the head of an occupant, said bag providing a downward force on an occupant and having at least one stub-shaped projection extending forwardly therefrom for engaging the instrument panel, said projection being inflatable.

4. Restraint apparatus as set forth in claim 3 further including an inflatable side curtain, said side curtain being connected to said torso bag for deployment therewith.

5. Restraint apparatus as set forth in claim 4 further including a plurality of restraining webs within said side curtain connecting opposite sides of said side curtain for maintaining the latter in a generally flat condition upon inflation.

6. Restraint apparatus for an occupant of a vehicle having a roof, an instrument panel and an occupant compartment under said roof and rearwardly of said instrument panel, comprising a source of gas, inflatable bag means, storage means adjacent said roof for holding said inflatable bag means in a collapsed condition, tube means connecting one portion of said bag means to said source of gas and located in a collapsed condition in said storage means, said tube means and portion of said bag means being inflated by the passage of gas through said tube means into said portion of said bag means, said portion of said bag means, when inflated, being spaced from said roof and held away therefrom by said tube means, inflatable positioning means on said one portion of said bag means, said positioning means being at least one inflatable stub which extends forwardly from said one portion of said bag means, said stub being adapted upon inflation to engage said instrument panel for positioning said one portion of said bag means with respect to said instrument panel.

7. Restraint apparatus for an occupant of a vehicle having a roof, an instrument panel and an occupant compartment under said roof and rearwardly of said instrument panel, comprising a source of gas, inflatable side curtain means, storage means adjacent said roof for holding said inflatable means in a collapsed condition, means connecting one portion of said inflatable means to said source of gas, said side curtain means being adapted, when inflated, to extend downwardly from said roof along one side of said vehicle, a plurality of restraining webs within said side curtain connecting opposite sides of said side curtain means for maintaining the latter in a generally flat condition upon inflation, each of said restraining webs having an elongated recess in at least one end thereof forming web portions, said web portions being adapted to diverge to lessen the strain on the connection between the end of the web and the sides of the side curtain means.

8. Restraint apparatus for an occupant of a vehicle having a roof, an instrument panel and an occupant compartment under said roof and rearwardly of said instrument panel, comprising a source of gas, inflatable bag means, storage means adjacent said roof for holding said inflatable bag means in a collapsed condition, tube means connecting one portion of said bag means to said source of gas and located in a collapsed condition in said storage means, said tube means and portion of said bag means being inflated by the passage of gas through said tube means into said portion of said bag means, said portion of said bag means when inflated, being spaced from said roof and held away therefrom by said tube means, said tube means and said one portion of said bag means providing an open space located above said one portion of said bag means and below said roof, said bag means further including a second portion held in said storage means in a collapsed condition, said second portion comprising a side curtain adapted, when inflated, to extend downwardly from said roof along one side of said vehicle, guide means connected to said side curtain for guiding the deployment of said side curtain, said guide means including a plurality of connectors extending between said one portion of said inflatable bag means and opposite sides of said side curtains.

9. Restraint apparatus for an occupant of a vehicle having a roof, an instrument panel and an occupant compartment under said roof and rearwardly of said instrument panel, comprising a source of gas, inflatable bag means, storage means adjacent said roof for holding said inflatable bag means in a collapsed condition, tube means connecting one portion of said bag means to said source of gas and located in a collapsed condition in said storage means, said tube means and portion of said bag means being inflated by the passage of gas through said tube means into said portion of said bag means, said portion of said bag means when inflated, being spaced from said roof and held away therefrom by said tube means, said tube means and said one portion of said bag means providing an open space located above said one portion of said bag means and below said roof, said bag means further including a side curtain held in said storage means in a collapsed condition, said side curtain adapted, when inflated, to extend downwardly from said roof, along one side of said vehicle, and at least one flexible connector member joining said side curtain and said one portion of said bag means for facilitating the deployment and placement of said one portion of said bag means and said side curtain.

10. Restraint apparatus for an occupant of a vehicle having a roof, an instrument panel and an occupant compartment under said roof and rearwardly of said instrument panel, comprising a source of gas, inflatable bag means, storage means adjacent said roof for holding said inflatable bag means in a collapsed condition, spaced tube means connecting one portion of said bag means to said source of gas and located in a collapsed condition in said storage means, said tube means and portion of said bag means being inflated by the passage of gas through said tube means into said portion of said bag means, said portion of said bag means when inflated, being spaced from said roof and held away therefrom by said tube means, said tube means and said one portion of said bag means providing an open space located above said one portion of said bag means and below said roof, said tube means including an extensible portion adapted to permit said tube means to yield upon impact by a passenger, said extensible portion comprising a portion of said tube means folded upon itself, said extensible portion remaining in its folded condition upon inflation of said bag means until said passenger engages said tube means in the area of said extensible portion.

* * * * *